Aug. 1, 1939.   J. A. LIGNIAN ET AL   2,167,986
FLUID SEAL ASSEMBLY
Filed Feb. 7, 1938       3 Sheets-Sheet 1

INVENTORS
Jean A. Lignian
Roland P. Koehring
Spencer Hardman Fehr
their ATTORNEYS

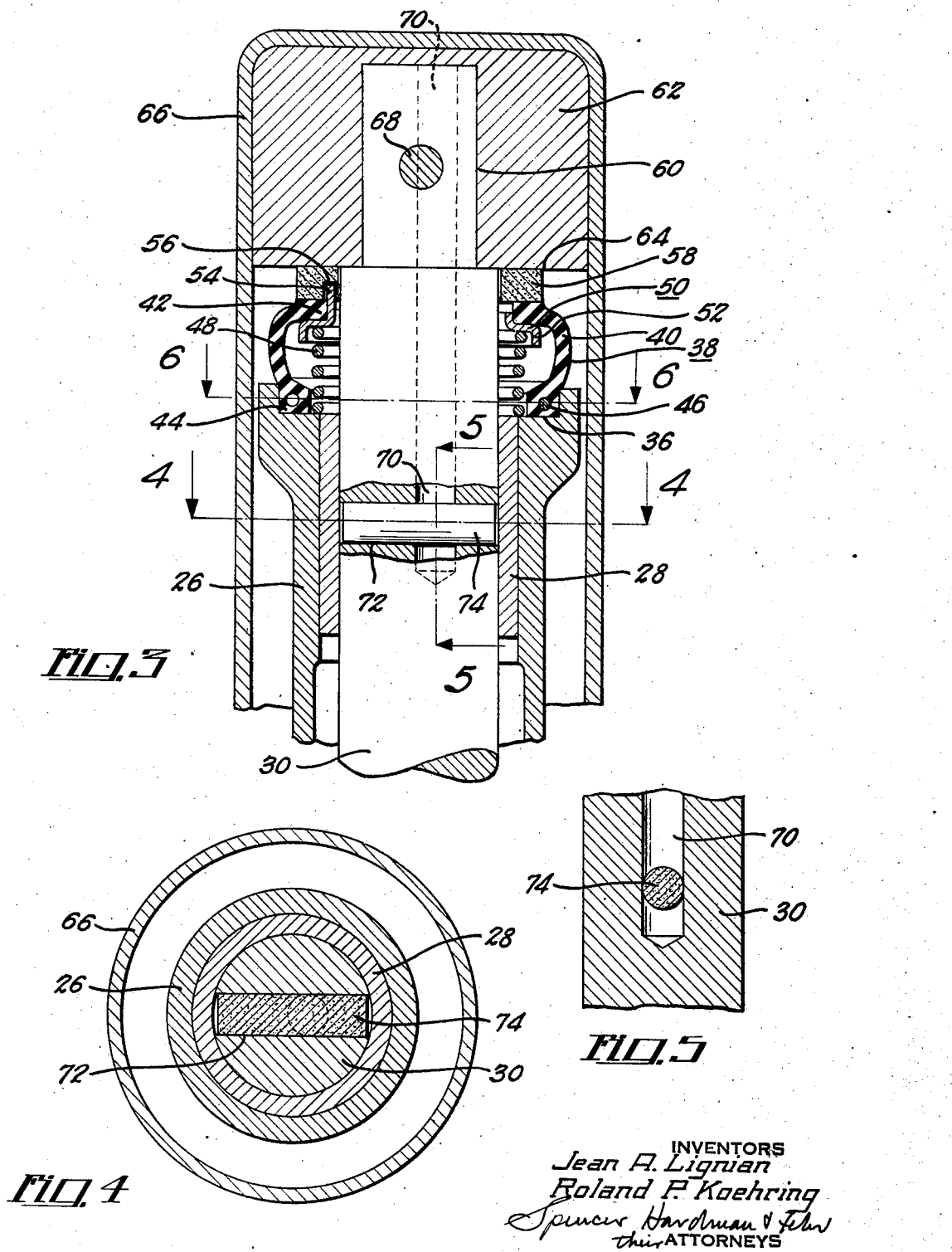

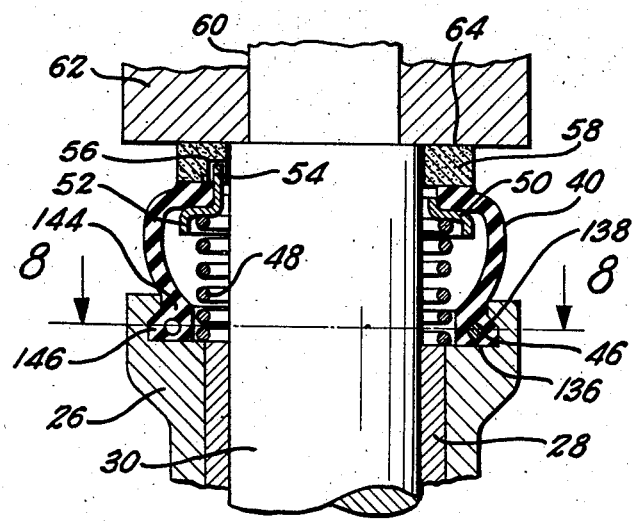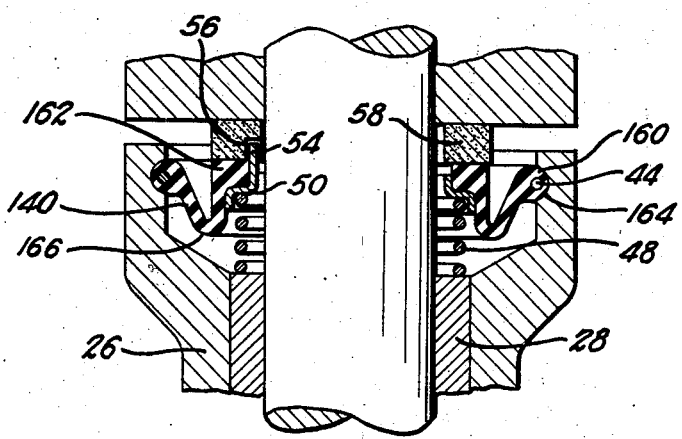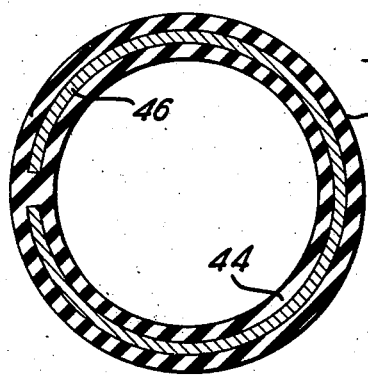

Patented Aug. 1, 1939

2,167,986

UNITED STATES PATENT OFFICE 2,167,986

FLUID SEAL ASSEMBLY

Jean A. Lignian and Roland P. Koehring, Dayton, Ohio, assignors to General Motors Corporation, Detroit, Mich., a corporation of Delaware Application February 7, 1938, Serial No. 189,128

7 Claims. (Cl. 286—11)

The present invention relates to fluid seal assemblies and more particularly to fluid seal assemblies used in connection with rotating shafts and the like.

One of the objects of the invention is to provide a fluid seal assembly, for sealing two relatively rotatable parts from one another, said assembly including a resilient cup-shaped member which has a circumferential spring molded therein adjacent one end thereof, said spring permitting the member to be compressed radially inwardly so that the member may be fitted into an undercut portion in one of said parts, said spring restoring the end of the cup-shaped member to its original shape within said undercut portion when the pressure is relieved and thereby releasably holding the member to the part.

It is another object of the invention to provide a fluid seal assembly for two relatively rotatable members which comprises, a resilient sealing part including two flanged portions formed integral therewith, one of said flanges having a circumferential spring molded therein, a groove being provided in one of said relatively rotatable members into which said spring carrying flange may be snapped for releasably holding the sealing part to the member, a seal ring disposed between said other flange and the other of said relatively rotatable parts and being held in sealing relation with said flange and said member by a spring which acts on the last mentioned flange and bears against the first mentioned member, said spring expanding said sealing part toward the second mentioned member.

It is a further object of the invention to provide the top, or other end, of the shaft housing of a washing machine with an undercut portion to be used as a seat for one end of a resilient fluid seal assembly, said fluid seal assembly having a spring of circumferential shape molded within the end thereof which fits into said undercut portion, said spring maintaining the shape of the assembly and also extending the assembly radially outwardly in sealing engagement with the walls of the undercut portion.

Another object of the present invention is to provide a washing machine with a fluid seal which is disposed between the agitator assembly and the center housing member, said seal being compressed axially by the agitator assembly for causing the seal to sealingly engage both the housing member and the agitator assembly.

It is a further object of the invention to provide a seal construction which prevents water within the tub of a washing machine from seeping into the gear case along the shaft that motivates the agitator.

It is a still further object to provide a seal assembly to be used in connection with the gear case of the washing machine for preventing grease from seeping out of the gear case along the driving shaft therefor.

In carrying out the above object it is a further object to associate the seal assembly with the pulley on the drive shaft so that the seal assembly rotates therewith.

It is a still further object to provide a seal assembly for washing machine which is disposed around the driving shaft for the agitator and between the top of the shaft housing and the agitator, said seal being of sufficient axial length so as to be compressed axially when the agitator is assembled to the shaft, the resilience of said seal assembly under compression creating the sealing pressure against a horizontal sealing surface carried by the agitator.

Further objects and advantages of the present invention will be apparent from the following description, reference being had to the accompanying drawings wherein preferred embodiments of the present invention is clearly shown.

In the drawings:

Fig. 3 is a view taken on line 3—3 of Fig. 1 illustrating, on an enlarged scale, the construction and assembly of the fluid seal used in connection with the agitator.

Fig. 4 is a view taken on line 4—4 of Fig. 3 showing the oiling system for the agitator shaft bearing.

Fig. 5 is a view taken on line 5—5 of Fig. 3 illustrating the disposition of the porous metal oil plug.

Fig. 6 is a view, on an enlarged scale, illustrating another form of sealing assembly.

Fig. 7 is a view, on an enlarged scale, illustrating still another modification of the sealing assembly, and, Fig. 8 is a view taken on line 8—8 of Fig. 6 showing, the circumferential spring.

Figure 1:
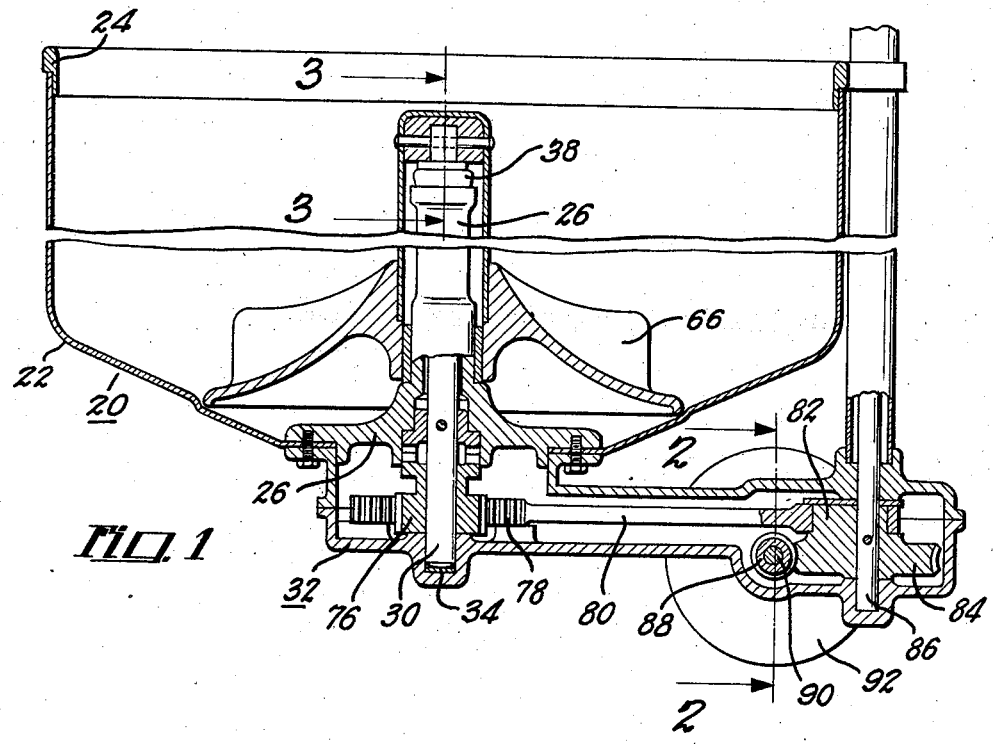
Fig. 1 is a view, in section, illustrating a washing machine assembly.
Figure 2:
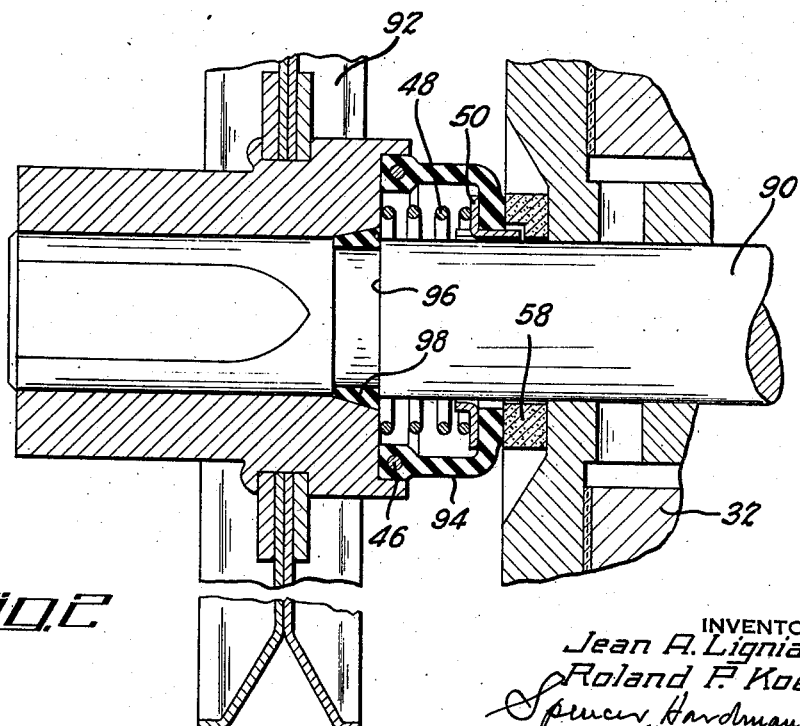
Fig. 2 is a view taken on the line 2—2 of Fig. 1, illustrating, on an enlarged scale, the gear case sealing assembly.

Referring to the drawings, Fig. 1 is a sectional view of a washing machine assembly 20. The assembly includes a tank, or tub 22, that has a reinforced rim 24 at the open top thereof, which open top may be closed by a removable cover (not shown). Extending upwardly within the tub, and suitably fastened to the bottom thereof, is a vertical shaft housing 26. The housing 26 has a bearing 28 pressed therein, adjacent the upper end thereof, and a drive shaft 30 is journaled within the bearing 28, the shaft 30 preferably extending upwardly beyond the housing 26. A lower housing member 32 supports a thrust disc 34 which acts as a bearing for the lower end of the shaft 30.

The upper end of the housing 26 is preferably undercut, as at 36, to provide a shoulder, or seat, for a sealing assembly 38. The sealing assembly 38 is disposed around shaft 30, and is fabricated from resilient material and is compressible axially of the shaft. The assembly 38 includes an annular cup-shaped member 40 which has an integral upper flange 42 and an integral lower flange 44 thereon. The flange 44, in the preferred form, has a circumferential spring 46 molded therein. It may be noted by referring to Fig. 8, that the spring 46 preferably does not extend entirely around the circumference of the flange 44 but has its ends spaced from one another a sufficient distance to permit the cup member 40 to be compressed radially inwardly around the flange 44 thereof. Thus when the cup 40 is assembled with housing 26 the spring 46 provides a releasable union between the flange 44 and the annular groove, or recess, formed by undercut portion 36 in the housing member 26.

Disposed around the shaft 30 and within the cup member 40 is a coiled spring 48. The spring 48 bears at one end thereof upon a portion of the housing 26 and at the other end thereof against a spring retaining washer 50, thereby acting to expand the cup member 40 axially of the shaft. The washer 50 seats directly against the upper flange 42 of the cup 40 and prevents the spring 48 from cutting into the cup, when heavy spring pressures are utilized. The washer 50 is bent outwardly around the outer periphery thereof to provide an annular flange 52 that maintains the spring 48 in alignment with the washer 50 and cup 40. An outwardly extending ear 54 is formed integral with the washer 50 and extends in the opposite direction to the flange 52 thereon, or if preferred, a plurality of ears 54 may be turned up on the washer 50. The ears 54 extend outwardly beyond the cup and engage recesses 56 molded in the sealing washer 58. Sealing washer 58 is disposed around the shaft 30 and bears at one side thereof on the flange 42 of cup member 40. The ears 54 align the washer 58 with respect to the cup member 40 and shaft 30 and prevent relative rotation between the washer 58 and the member 40. The ears 54 are preferably a loose fit within recesses 56 thus allowing fractional angular displacement of the washer with respect to the cup and thereby eliminating the necessity of precision manufacture. If desired, sealing washer 58 may be cemented to the top of the cup member 40 and the ears 54 of spring retaining washer 50 can thereby be eliminated or, if the spring load on flange 41 is not too heavy, the washer 50 can also be eliminated.

The upper end of shaft 30 is preferably squared, as at 60, and carries thereon a hub 62 which has a squared hole therein disposed to fit over the squared part 60 at the upper extremity of the shaft 30. The lower surface of the hub 62 namely surface 64, is preferably machined and polished and it is against this surface that the seal ring 58 rides and seals. It will be observed that the distance between the surface 64 and the shoulder 36 is slightly less than the free axial length of the sealing assembly 38. Thus when the shaft 30, with the hub 62 thereon, is pressed downwardly against its thrust bearing 34 the sealing assembly 38 is compressed axially of the shaft and thereby sealingly engages the aforementioned surfaces. The hub 62 is associated with an agitator 66 which surrounds the shaft housing 26 and the hub 62 may or may not be integral with the agitator 66. The agitator 66, hub 62 and shaft 30, which comprises the agitator assembly is of sufficient weight to cause the aforementioned axial compression of the seal assembly. After the agitator 56 is assembled to the shaft, it is preferable to pass a pin 68 through the entire assembly to prevent accidental displacement thereof. It is apparent that the sealing surface 64 could be formed integral with the shaft by providing a shoulder thereon and it is to be understood that the present invention contemplates such a structure.

Fig. 6 shows a modification in the design of the cup 40 particularly with respect to the lower end thereof. In this instance, a flange 144 is provided which has an outwardly extending lip 146 thereon. The spring 46 is molded, as previously explained within flange 44. In the particular embodiment the top of the housing 26 is undercut at 136 so as to provide an overhanging lip 138 thereon. Thus the cup member 40 may be compressed radially inwardly around the flange 144 and snapped into the groove formed by the undercut portion 138 and the lip 146. The spring 46 thereupon expands the flange 144 to its original shape and releasably locks the cup member 40 to the housing 26.

Another modification of the cup design 40 is shown in Fig. 7, wherein a resilient diaphragm type of cup 140 is utilized. The cup 140 includes two spaced flanges 160 and 162 thereon. Flange 160 has a circumferential spring 44 molded therein and is of greater diameter than flange 162. The housing 26 is machined to form an annular groove 164 therein. The groove 164 is shaped in a female configuration corresponding to the shape of the flange 160. Thus the cup member 140 can be associated with housing 26 by snapping the flange 160 thereof into groove 164. A spring 48 bears at one end thereof against the bearing 28 and at the other end thereof against washer 50 and thereby exerts an expanding force on cup member 140. It will be noted that the cup member 140 includes an annular loop portion 166, which permits substantial axial movement of the cup member 140 to take up for wear in the moving parts and to insure positive sealing action of the seal assembly.

In order to provide lubrication for the bearing 28 the shaft 30 is bored lengthwise thereof but slightly off center as at 70 so as to permit a free passage past the pin 68. The bore 70 extends downwardly and adjacent the lower end thereof a transverse bore 72 is provided which passes through the bore 70 at right angles thereto. A porous metal plug 74 is pressed into the bore 72 and is of sufficient length so that it terminates adjacent the bearing surface of the shaft 30. The bore 70 may be filled with oil or other lubricant and the porous metal plug 74 thereupon acts as a metering device which carries oil outwardly by capillarity within the pores of the metal plug 74, which oil is then taken up between the bearing 28 and the shaft 30 for lubricating purposes. The surface tension of the oil prevents an over-lubrication of the bearing since it creates a pressure minutely in excesss of atmospheric pressure when sufficient oil is present at the bearing surface and thereby substantially prevents further capillary flow of oil through the plug 74. Porous metal plugs of the character described are manufactured by sintering together finely divided powdered metals and are well-known to the art.

The lower end of shaft 30 carries a gear 76 thereon which is engaged by a rack gear 78, suitable clutch mechanism (not shown) being provided for engaging and disengaging the said gears. The rack 78 is connected by an arm 80 to an eccentric 82 associated with gear 84 carried by the shaft 86, thus as the gear 84 rotates, the eccentric 82 reciprocates the rack 78 through the medium of the associated arm 80, to cause the gear 76 and the agitator 66 to be reciprocated. Shaft 86 also drives a wringer (not shown). A worm 88 engages, and drives, the gear 84 and is carried by a shaft 90 which extends outwardly through the housing 32 and is associated with a pulley 92 at the outer end thereof. The pulley 92 is driven by a motor (not shown) through a belt drive (not shown).

A second fluid seal assembly 94 is utilized to prevent the outflow or seepage of grease from the housing 32. The seal assembly 94 is identical to the assembly 38 previously explained with the exception that it rotates with the shaft 90, being carried by the hub of the associated pulley 92. To prevent any possibility of grease seeping through the joint between the pulley 92 and the shaft 90, a circumferential groove 96 is cut into the shaft 90 and a resilient band 98 is snapped thereon. The band 98 is wedge-shaped in cross section and when the pulley is assembled to the shaft 90 completely seals the joint therebetween.

The present sealing assembly as shown in the drawings substantially completely prevents water, water vapor, or steam within the tub 22 from entering the shaft housing 26. In the past, packing has been placed around the shaft but such an expedient has never proven completely satisfactory since it has been impossible to keep the packing tight without frequent manual adjustments, and after a period of wear thereon, water, steam etc. passes between the shaft and the packing thereby corroding the bearing 28 and likewise seeping down into the gear case and having a deleterious effect upon the mechanism thereon. The present invention prevents water from seeping into the housing since the seal assembly 38 is self-adjusting i. e. to say as the seal ring wears, the spring 48 expands the sealing assembly axially of the shaft and maintains a fluid tight seal. Likewise as the thrust bearing 34 wears, and the shaft settles slightly, the seal assembly 38 is compressed axially of the shaft without any detrimental effects on its sealing ability.

In the preferred form the cup members 40 and 140 of the seal assemblies are formed from polymerized neoprene or chloroprene or some other similar synthetic rubber material. Such materials have been found to be more resistant to the deleterious effects of oil and water than natural rubber compositions although rubber can be used in many applications of the present seal. The sealing washer 58 is preferably fabricated from one of the phenol formaldehyde condensation products of the thermal setting type commonly known as Bakelite, and includes a substantial quantity of powdered metal dispersed therethrough. This metallic ingredient, for example, bronze, brass, copper, iron or lead powder, etc., provides a wear surface on the Bakelite which gives it long life with a low coefficient friction. It has been found that a quantity of metal powder ranging from 25 to 60 percent by weight of the total weight of the seal ring yields very desirable and successful results although other proportions may be utilized. Such a seal ring has a very low effective moment of inertia and is much more flexible in use than an all metal seal ring. The low effective moment of inertia permits the seal ring to readily follow eccentric movement of the sealing surface, which flexibility is not possible when using a heavy all metal seal ring. Obviously, other plastic materials may be used as a base material on the seal ring, such as synthetic rubbers, hard rubber and other plastic molded materials which are not deleteriously affected by the fluids to be sealed.

From the foregoing description it will be apparent that we have provided an extremely effective and flexible self-adjusting fluid seal to be used in connection with relatively rotatable parts.

While the embodiments of the present invention as herein disclosed, constitute preferred forms, it is to be understood that other forms might be adopted, all coming within the scope of the claims which follow.

What is claimed is as follows:

1. In combination with two members relatively rotatable with respect to one another, of a fluid sealing assembly comprising in combination, an annular resilient sealing part, two flange portions formed integral with said part, a circumferential spring associated with one of said flanges, a groove formed in one of said members, said spring carrying flange being dimensioned so as to snap into said groove for holding the part to the member, a sealing surface associated with the second of said members, a seal ring disposed between said sealing surface and the other flange of said sealing part, and a spring bearing against said other flange and a portion of the first mentioned member for expanding the resilient sealing part toward the second mentioned member.

2. A fluid seal in combination with two relatively rotatable members comprising, a resilient sealing member, two spaced flanges formed integral with said sealing member, a circumferential spring molded within one of said flanges, an annular groove formed in a part of one of said relatively rotatable members, a sealing surface associated with the second of said members, said spring carrying flange being disposed to snap into said groove for holding the sealing member to the first of said relatively rotatable members, a seal ring disposed between the second of said flanges and said sealing surface, and resilient means bearing on a part of the first mentioned member and acting on said second mentioned flange for expanding said sealing member from its normal position for causing the seal ring to sealingly engage the sealing surface and the second mentioned flange.

3. In a fluid seal assembly in combination with a rotatable shaft and housing therefor, a hub assembly mounted on said shaft and rotatable therewith, a circumferential under-cut portion in said housing, a resilient fluid seal assembly fitting into said under-cut portion at one end of the assembly and being compressed axially between said hub portion and a portion of the housing, said fluid seal assembly being non-rotatable with respect to the shaft and sealing against the housing; a circumferential groove in said shaft substantially at the joint of the shaft and the hub and adjacent the under-cut portion of the hub, a resilient annular sealing band disposed to snap into said under-cut portion on the shaft and fit snugly against the hub and thereby seal the joint between the hub and the shaft.

4. A fluid seal in combination with two parts relatively rotatable with respect to one another, one of said parts including an under-cut portion having an over-housing lip thereon, a resilient annular cup-shaped member, a circumferential spring molded into said cup-shaped member at one end thereof with the adjacent ends of the spring out of contact with one another, said cup member being compressible radially so that the spring carrying end thereof may be snapped into the under-cut portion of said first mentioned part, a sealing washer fabricated from a thermal setting resin and having a substantial quantity of bronze powder dispersed therein, adapted to engage the other end of said cup member on one side thereof and to engage the second of said relatively rotatable parts on the other side thereof, and spring means bearing against a portion of the first mentioned part and against the inner side of said cup member for expanding the cup member axially and thereby sealing the member to the washer and sealing the washer to the second mentioned part.

5. A fluid seal assembly in combination with a shaft and housing said shaft being rotatable within the housing, a shoulder hermetically associated with said shaft, a resilient annular cup-shaped member disposed around the shaft, an under-cut portion on the housing at the outer end thereof, a circumferential spring molded into said cup member at one end thereof for maintaining the shape of said cup member, said spring containing end of the cup member being a snug fit within the under-cut portion of the housing, a spring disposed around the shaft and bearing at one end on the housing and at the other end on the cup member for expanding the cup-member axially of the shaft, a Bakelite sealing washer having metallic particles dispersed therein for providing a wear resistance surface thereon, said washer being disposed about the shaft and between the outer end of said cup member and said shoulder for sealingly engaging the member and the shaft.

6. A fluid seal in combination with two relatively rotatable members, an annular resilient sealing part, spaced integral flanges on said part, a circumferential spring molded in one of said flanges, a groove formed in one of said members, said spring carrying flange being adapted to be snapped into said groove for holding the sealing part to the member in non-rotative relation thereto, said other flange facing the other member, and a spring bearing against a part of the first mentioned member for urging the second mentioned flange toward the second mentioned member.

7. In combination with two members relatively rotatable with respect to one aonther, of a fluid sealing assembly comprising in combination, an annular resilient sealing part, two flange portions formed integral with said part, a circumferential spring associated with one of said flanges, an undercut portion formed in one of said members, said spring-carrying flange being so dimensioned as to be a snug fit within said undercut portion for holding the part to the member, a sealing surface associated with the second of said members, a sealing ring disposed between said sealing surface and said other flange of said sealing part, and resilient means bearing against said other flange and against a portion of the first-mentioned member for pressing the resilient sealing part outwardly into sealing relation with the sealing ring and for pressing the sealing ring into sealing relation with said sealing surface.

JEAN A. LIGNIAN.
ROLAND P. KOEHRING.